United States Patent [19]
Moskowitz et al.

[11] 3,756,020
[45] Sept. 4, 1973

[54] GAS TURBINE ENGINE AND COOLING SYSTEM THEREFOR

[75] Inventors: Seymour Moskowitz, Fort Lee; Hargus Watts, Mahwah; Arthur R. Stappenbeck, Pequannock, all of N.J.

[73] Assignee: Curtis-Wright Corporation, Wood-Ridge, N.J.

[22] Filed: June 26, 1972

[21] Appl. No.: 266,331

[52] U.S. Cl. ............... 60/39.66, 416/96, 415/114, 415/176, 415/178, 60/39.31, 60/39.65
[51] Int. Cl. .............................................. F02c 7/12
[58] Field of Search ............... 60/39.66, 39.65, 60/39.23, 39.29, 39.31; 415/176, 178, 114, 115, 117; 416/96, 97

[56] References Cited
UNITED STATES PATENTS

| | | | |
|---|---|---|---|
| 2,622,789 | 12/1952 | Lundquist | 60/39.31 X |
| 2,708,564 | 5/1955 | Erickson | 415/114 |
| 2,839,268 | 6/1958 | Allen | 416/96 |
| 2,868,500 | 1/1959 | Boulet | 416/96 |
| 2,947,512 | 8/1960 | Jones | 415/114 |
| 2,977,090 | 3/1961 | McCarty | 416/96 |
| 3,355,883 | 12/1967 | Beam | 60/39.66 X |
| 3,600,890 | 8/1971 | White | 415/177 |

*Primary Examiner*—Clarence R. Gordon
*Attorney*—Raymond P. Wallace et al.

[57] ABSTRACT

The stator vanes and rotor blades of a gas turbine engine are cooled internally by the circulation of a fluid coolant in a closed and sealed system, the heat absorbed from the blades and vanes by the coolant being extracted in a heat exchanger cooled by bleed air from the compressor, and the air thus heated then returning its heat load to the power cycle by being fed into the combustion chamber to take part in the combustion reaction. The engine is designed in such a manner that the turbine rotor with its blades and sealed internal cooling system, and the stator ring with its vanes and sealed internal cooling system, can be disassembled from the engine as units without breaking the sealed cooling system.

12 Claims, 4 Drawing Figures

GAS TURBINE ENGINE AND COOLING SYSTEM THEREFOR

BACKGROUND OF THE INVENTION

Shaft horsepower and specific fuel consumption of gas turbine engines are directly related to turbine inlet temperature. Turbines are currently designed to operate at a turbine inlet temperature at which the mechanical properties limit the engine operating life. The inlet vanes and rotor blades are the critical components which limit the temperature at which the turbine can be operated. Thus, the turbine inlet temperature is limited to about 1,600° F to 1,800° F in uncooled turbines.

To take advantage of performance improvements offered by an increased turbine inlet temperature, turbine designs have evolved which use air bled from the compressor to cool the stator and rotor blading to about 1,600°-1,800° F metal temperature. Various systems of applying such cooling air to the blades are known, such as routing it through channels in the blades and discharging it at the tips or trailing edges, or by transpiration cooling, wherein the air is fed to the hollow interior of the blade and bleeds through a porous skin. However, the engine performance gained through the increased inlet temperature is degraded in part by direct cooling with compressor bleed air, since such air is discharged into the exhaust gases and the heat load extracted from the blades is lost. Other losses include the compressor work associated with the bleed cooling air, the loss of such air as a working fluid in the turbine, dilution and mixing losses associated with injection of the bleed air into the gas stream after cooling the blading, and reduced blade efficiency due to manufacturing compromises in the airfoil geometry to incorporate the open-ended cooling passages, or due to surface roughness of porous airfoils and other cooled blades having surface apertures.

Regenerative turbine engines are known in which a portion of the heat in the exhaust gases is extracted by a heat exchanger positioned within the exhaust duct, the fluid of the heat exchanger being then passed to a second heat exchanger where its heat is extracted by incoming air from the compressor, which air then enters the combustion process. In turbine engines of this type the vanes and blades of the turbine, if cooled at all, are cooled by bleed air from the compressor discharge, which air after cooling the turbine is fed into the gas stream. Such blade cooling procedure does not differ from that discussed above and has the same disadvantages.

Other cooling arrangements have been proposed, for instance that of U. S. Pat. No. 2,883,151. In that patent the stator vanes are not cooled, and the rotor blades have internal passages containing water, communicating with longitudinal double concentric annular passages within the hollow shaft, forming a closed system through which the water or steam circulates by the centrifugal pumping action of the rotor blades, owing to the difference in density between the hotter coolant exiting from the blade passages and the coolant entering them. The water or steam within the annular passages of the rotary shaft is cooled by fuel circulating through further double passages in a stationary stub shaft re-entrant within the hollow rotary shaft, which arrangement thus constitutes a heat exchanger, the fuel subsequently being delivered to the combustion chamber. However, the difficulty of fabricating such a system would be enormous, owing to the necessity of having the hollow shaft containing the double annulus rotate around a re-entrant hollow stationary shaft, and in intimate contact therewith throughout the entire length in order to obtain heat transfer.

Another arrangement having a closed heat exchanger system is disclosed in U. S. Pat. No. 3,651,645. Air delivered by the compressor is normally somewhat heated, owing to the effect of compression. Bleed air from the compressor is used in this patent to cool the rotor blades and is then discharged into the exhaust, but in order to secure cooler bleed air and thus a greater cooling effect, the bleed air as it comes from the compressor is passed through one side of a sealed heat exchanger system. The internal fluid of the heat exchanger is then pumped to a second heat exchanger disposed in the annulus downstream from a ducted fan, which provides less-pressurized cooler air to extract the heat transferred from the highly compressed air. Since this is direct air cooling of the blades, with the air being then discharged into the exhaust, it is subject to the disadvantages discussed above, the only net gain being the availability of cooler air for blade cooling. However, there must be offset against this the power consumed by the pump of the heat exchanger system.

SUMMARY OF THE INVENTION

The present invention relates to gas turbine engines, and more particularly to high performance turbines requiring a turbine inlet temperature higher than can be withstood by uncooled blades. The invention provides means by which the stator vanes and the rotor blades are maintained at acceptable temperatures, and the thermal energy absorbed by the stator vanes and the rotor blades is extracted therefrom and returned to the power cycle. The return of this thermal energy improves the specific fuel consumption of the engine, so that less fuel is required to maintain a given inlet temperature and power output. It also avoids the loss of cooling air from the combustion process and as a working fluid in the turbine, and thus conserves the compressor work associated with bleed cooling air. It also minimizes thermal gradients in the vanes and blades by sizing the internal coolant flow passages without direct influence from the external, or gas side, pressure profile.

These advantages are achieved by having both the stator vanes and the rotor blades internally cooled by a closed system, and passing the internal coolant through heat exchangers which are cooled by one of the two components of the main gas stream, that is, either the air or the fuel, and then routing that component to the combustion chamber to take part in the combustion process and to be utilized as a working fluid. To overcome the disadvantage of the prior art which required opening the sealed cooling system to disassemble the engine, the present invention has the heat exchanger for the rotor blades borne by the rotor and demountable therewith as a single unit, the pumping of the cooling fluid being accomplished by the thermosyphon principle. The stator ring with all its blades, heat exchanger, and pump is also demountable as a single unit, in both cases without having to open the sealed coolant system.

It is therefore an object of the present invention to provide a high performance turbine engine in which the stator vanes and rotor blades are cooled to withstand the high turbine inlet temperature of the gas stream.

It is another object to provide a gas turbine engine in which the heat load is extracted from the stator vanes and rotor blades and returned to the power cycle.

It is a further object to provide such an engine in which heat so extracted is returned to the power cycle by means of one or both the components of the main gas flow.

Another object is to provide such an engine in which the vanes and blades are internally cooled by a closed system, and the rotor and stator of the engine are demountable therefrom without opening their sealed internal cooling systems.

Other objects and advantages will become apparent on reading the following specification in connection with the accompanying drawings.

DESCRIPTION OF THE PREFERRED EMBODIMENTS

Figure 1:
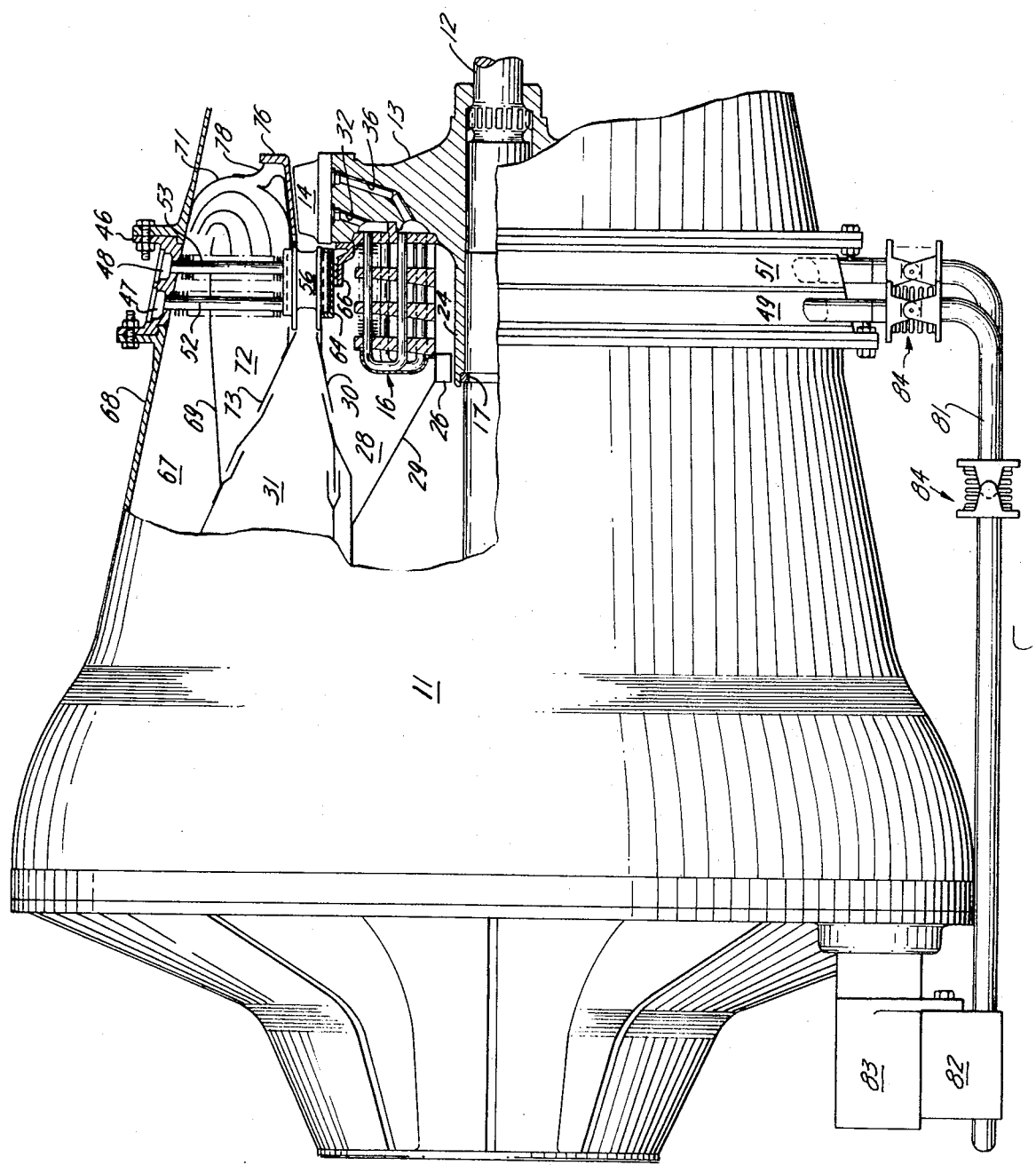
FIG. 1 is an elevation, partly in cross-section, of an engine according to the invention.

In FIG. 1 there is shown an overall view of a turbine engine 11 according to the invention. As shown, turbine engine 11 has a centrifugal compressor and is intended either to deliver power from the shaft 12, or as a gas producer for a further power turbine, but the inventive concept may equally well be embodied in a turbine with an axial compressor, and adapted for other uses.

Figure 2:
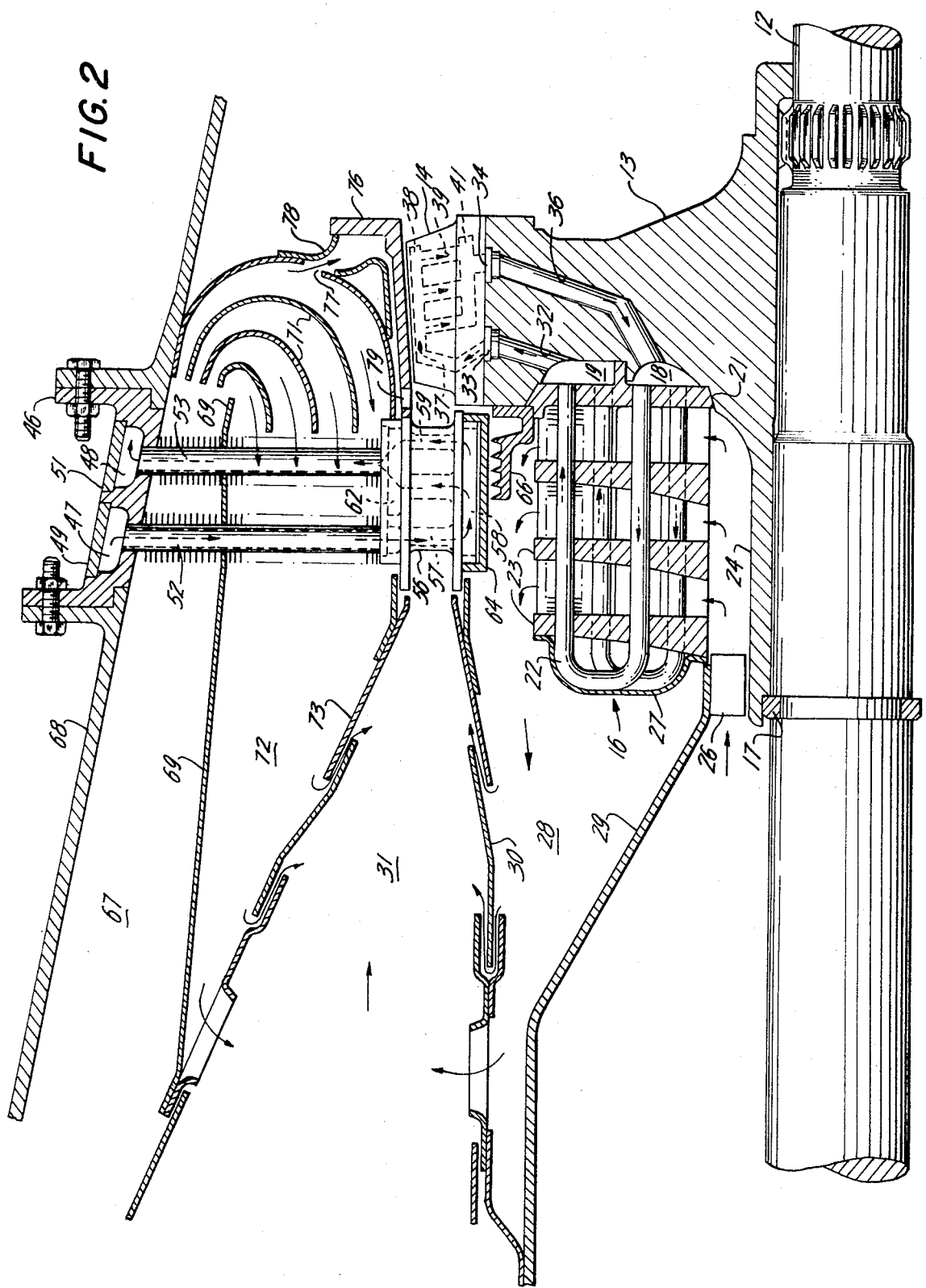
FIG. 2 is an enlarged view of the cutaway portion of FIG. 1.

The details of the mechanism are better shown in FIG. 2, which is an enlargement of the cross-sectioned portion of FIG. 1. A turbine rotor 13 is keyed or splined to the shaft 12, and bears a plurality of turbine blades 14. A generally annular rotary heat exchanger 16 is borne by the upstream face of the rotor, and the rotor 13 with its blades 14 and the heat exchanger 16 are removable as a complete unit from the engine, by disengaging the rotor from its splines and sliding it from the shaft in the downstream direction. A ring 17 around the shaft or other suitable keying means provides a stop at the upstream end of the rotor and locates it in the operating position.

The upstream face of the rotor is provided with two concentric channels or manifolds, a radially inner manifold 18 surrounded by a radially outer manifold 19. These manifolds are closed at the upstream side by an annular cover plate 21 which is welded to the rotor and serves as a support for the tube bundle of the heat exchanger 16. The tube bundle comprises a plurality of U-shaped tubes 22 with their open ends seated in bores through the annular support plate 21. Tubes 22 are circumferentially spaced in an annular configuration with their U-bends disposed in the upstream direction, and with one leg of each tube being the radially inward leg and having its open end communicating through plate 21 with the radially inward manifold 18, and its radially outward leg having its open end communicating with the radially outward manifold 19. The U-shaped tubes also pass through bores in a plurality of annular discs or plates 23 spaced apart in the axial direction successively upstream from support plate 21. The annular plates 23 serve to stiffen and position the tube bundles into an integral structure, and may be made thicker at their inner periphery than at the outer periphery to aid in withstanding centrifugal stresses, since the entire heat exchanger 16 rotates with the turbine rotor.

Liner baffling 29 bears a plurality of circumferentially disposed swirl vanes 26 which receive axially flowing air bled from the compressor and direct it into the annular space surrounding the forward end of the rotor hub 24, whence it flows radially outwardly between the annular discs 23 across the tubes 22. Although the swirl vanes are shown mounted on the liner baffling, they may also be mounted on the forwardly extending portion of the rotor hub, particularly when it may be desired to add a little pumping pressure to the flow of air through the heat exchanger 16.

An annular cap 27 is affixed over the U-bends of the upstream end of the tube bundle so that the air must pass fully across the tubes before being discharged into chamber 28 formed by liner baffling 29 and 30, whence it passes through apertures in the baffling 30 into the main gas flow in combustion chamber 31. Although there is a slight pressure drop of the air in passing through the heat exchanger, the pressure level in the combustion chamber 31 is lower, so that there is no difficulty in transferring the coolant air into the main gas stream.

The turbine rotor 13 is provided with a plurality of bores 32 extending generally radially outwardly from the outer face manifold 19 and communicating with an annular manifold channel 33 in the periphery of the rotor disc adjacent to the roots of blades 14 and disposed toward the upstream face of the rotor. A second annular channel or manifold 34 is formed in the rotor periphery downstream from manifold 33. A plurality of bores 36 lead generally radially inwardly from manifold 34 and communicate at their inward ends with the inner manifold 18 on the upstream face of the rotor.

Each of the rotor blades 14 is provided with at least one entrance passage 37 through the blade shelf and internally of the airfoil portion and extending radially outwardly adjacent to the leading edge, which passages 37 communicate at their root ends with peripheral manifold 33. Internally of each blade tip is a manifold chamber 38 communicating with the passage 37 and extending therefrom in the downstream direction toward the trailing edge of the blade. One or more internal blade passages 39 extend from the tip manifold 38 to a root manifold 41 to cool the blade shelf in each blade, which root manifold 41 in turn has a passage communicating with the downstream peripheral manifold 34 of the rotor.

It will be seen that the various passages of the tube bundle, the manifolds on the upstream rotor face, the radial passages in the rotor, and the blade passages and manifolds comprise a closed circulation system. All joints and seams of the circulation system are securely sealed, as by brazing, electron beam welding, tungsten electrode welding with inert gas, or other convenient means, forming a leak-proof unit.

The circulation system may be filled with coolant through a bore (not shown) in the rotor disc, which is then plugged and welded to preserve a sealed system. One satisfactory coolant fluid is liquid metal, such as a mixture of sodium and potassium, or other metals which are fluid at low enough temperatures for engine starting. A gas may also be used as an internal coolant fluid, such as air or helium, or the system may be partially filled with water which yields steam as the coolant fluid during operation. Tubes 22 of the heat exchanger 16 bear external cooling fins when a liquid is used as the internal coolant, but may be bare when gas is used.

The internal coolant, whether a liquid or a gas, has a higher density at cooler temperatures than at elevated temperatures, and the closed rotor cooling system operates by the thermosyphon principle. The coolant fluid which has passed through the heat exchanger 16 is therefore impelled by centrifugal force from manifold 19 radially outwardly through passages 32 to peripheral manifold 33 from which it enters the blades. The fluid then passes outwardly through passages 37 in the blades to the tip manifolds 38, and then radially inwardly through passages 39. In such circulation through the blades it has absorbed heat therefrom and lowered its density, so that it now travels radially inwardly through passages 36 to manifold 18, from which it circulates through the heat exchanger and is ready to continue the blade cooling process.

The stator assembly with all its vanes and cooling system is also demountable from the engine as a complete unit. In FIG. 2 there is shown a flanged stator support ring 46 bolted between flanges extending from the outer casing 68 of the engine. An annular intake manifold 47 and an annular outlet manifold 48 are formed in the support ring, and sealed by annular covers 49 and 51 respectively. A plurality of inlet tubes 52 and outlet tubes 53 extend radially inwardly from their respective manifolds, there being at least one inlet and at least one outlet tube for each stator vane. These tubes comprise the heat exchanger portion of the stator assembly, and may be finned if the internal coolant is be be liquid metal, or bare if the coolant is gas or steam. In the case of gas or steam coolant with unfinned tubes it is preferable that a larger number of small tubes be used for each vane, in order to secure more cooling surface.

Stator vanes 56 are positioned in an annular configuration upstream from the turbine blades. Each stator vane has at least one internal passage 57 adjacent to its leading edge, and in communication with its inlet tube 52 and with a vane manifold 58 under the radially inward vane shelf. One or more internal passages 59 lead from the manifold 58 to a vane exit manifold 62 above the outer vane shelf which communicates with its outlet tube 53. Manifolds 58 and 62 serve to cool the vane shelves as well as interconnecting the various airfoil passages. The root ends of vanes 56 are secured to a stiffening ring 64, the inner periphery of which also serves as a sealing surface for a rotary labyrinth seal 66 borne by the rotor.

An annular chamber 67 is formed by the outer shell 68 of the engine and liner baffling 69. The tubes 52 and 53 extend through slots cut into the downstream end of baffling 69, so that the outer portions of the tubes are located within the chamber 67. Compressor discharge air travels through chamber 67 and across the outer portions of the tubes. Downstream from the tubes and from the rearward end of baffling 69 a plurality of turning baffles 71 are positioned. These baffles reverse the direction of air flow and direct it forwardly across the inner portions of the tubes into a chamber 72 formed by baffling 69 and 73. From chamber 72 the air passes through apertures in baffling 73 into the main gas flow of combustion chamber 31. Although there is a slight pressure drop across the heat exchanger, as in the case of the rotor heat exchanger it is less than that of the combustion chamber and the air enters the main gas stream without difficulty.

An outer shroud 76 for the rotor blades is borne by the outer vane shelves of the stator and extends rearwardly, surrounding the tips of the rotor blades 14. Shroud 76 may be cooled by a portion of the air directed across the tubes of the stator heat exchanger. The rearmost member of turning baffles 71 is provided with apertures 77 through which some of the air is bled off and is directed by auxiliary baffling 78 against an outwardly extending flange of the shroud at its downstream end. The air then passes forwardly across the outer surface of the shroud and through apertures 79 in the shroud just forward from the leading edges of the rotor blades, where it joins the main gas flow through the turbine.

Instead of the air heat exchanger system shown for the stator, the tubes 52 and 53 may circulate their internal coolant through a heat exchanger which uses the other component of the main gas flow, that is, fuel, as the means of extracting the heat energy from the vane internal coolant, the heated fuel being then used for combustion in the main gas flow.

External tubing 81 (shown in FIG. 1) communicates with the inlet manifold 47 and the outlet manifold 48 of the stator ring assembly through the cover plates 49 and 51, and delivers the stator internal coolant to and from a pump 82 (shown schematically), which is driven by a power takeoff 83 from the engine. If liquid metal is used as the stator internal coolant the pump 82 may be of the well-known type having a rotary permanent magnet so that the liquid passes through in a continuous loop of tubing without exposure to any moving parts and remains sealed in the system. If the coolant is a gas or steam, a canned electrical pump may be used, positioned at any convenient location.

Tubing 81 has one or more flexible bellows joints 84 disposed in each leg thereof, to allow for displacing the pump sufficiently from its operating position to allow disassembly. It will therefore be seen that the entire stator assembly with its vanes, rotor shroud, and sealed cooling system may be demounted as a single unit from the engine by unbolting ring 46 from the engine shell and removing it rearwardly, after the rotor assembly has been removed.

Figure 3:
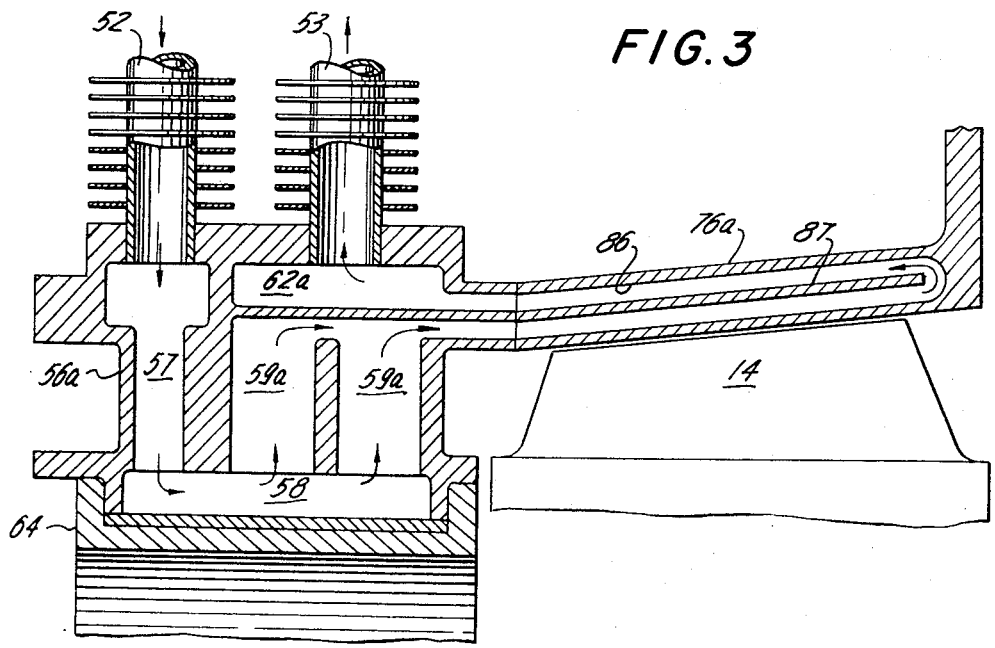
FIG. 3 is an enlarged view of a modification of a portion of FIG. 2.

FIG. 3 shows a modified stator vane and rotor shroud wherein the shroud is internally cooled by the internal coolant of the vanes, rather than by a bleed of the air passing across the stator heat exchanger. The stator vane 56a is similar to those previously described in having an inlet tube 52, at least one leading edge passage 57, an inner manifold 58, and one or more collant passages 59a. The passages 59a, however, do not discharge directly into the vane exit manifold 62a, but into an internal passage 86 within the shroud. Passage 86 traverses the width of the shroud from its upstream edge to the vicinity of its downstream edge and then returns in the reverse direction, the two legs of the passage being separated by a partition 87 except at the turn. Passages 86 may have their two legs disposed in radially tiered fashion as shown, or spaced circumferentially in side-by-side relationship in order not to increase the shroud thickness. Passages 86 discharge into the vane exit manifold 62a, from which the coolant passes into the outlet tube 53. This method of cooling the shroud is particularly useful when fuel instead of air is used to extract the heat from the stator internal coolant.

Figure 4:
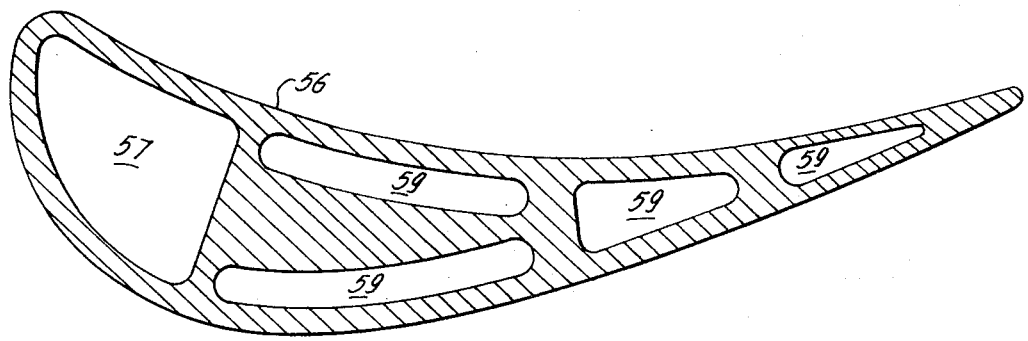
FIG. 4 is a transverse cross-section through a typical stator vane.

FIG. 4 shows an enlarged cross-section of the airfoil portion of a generally typical stator vane 56 or 56a. Although the vane is shown with only one incoming passage 57 adjacent to the leading edge of the vane and communicating with the inner manifold 58, it may have a plurality of such incoming passages. A plurality of internal passages 59 are shown. Further, the passages 59 are not necessarily centrally disposed along the chord of the vane, but where thickness allows, as in the midportion, there may be separate passages 59 disposed close to the surface of the vane, as shown.

From the foregoing discussion it is evident that the present invention provides a turbine engine having a high inlet temperature in which the stator vanes and rotor blades can nevertheless be maintained at a temperature which can be withstood by available metals. This is accomplished by extracting thermal energy from the vanes and blades by an internal fluid coolant and then removing the heat from the fluid coolant in a heat exchanger by one of the components of the main gas flow, such component being then fed into the combustion chamber to take part in the combustion process and provide working fluid. Thus the thermal energy extracted from the vanes and blades is not lost but returned to the power cycle, improving the efficiency and the specific fuel consumption of the engine.

The engine has a desirable simplicity in disassembly, in that the turbine rotor and the stator ring can be demounted as units without the necessity of interrupting the circulatory system of their internal coolant. The circulatory system has no detachable mechanical seals or joints which might fail in operation.

The amount of compressor discharge air to be diverted across the heat exchanger before being returned to the combustion process naturally varies with several factors, as for instance the size of the engine, the desired turbine inlet temperature, suitable metal temperatures, and other parameters. However, in one embodiment of a relatively small turbine, for example, it was found adequate to deliver approximately 60 percent of the compressor output directly into the combustion chamber, and to divert approximately 30 percent to the stator heat exchanger and approximately 10 percent to the rotor heat exchanger before returning such air to the combustion system.

Although the engine is shown and described as a single spool engine with only one stator ring and one turbine rotor, the invention may equally well be applied to multispool engines with a cascade of stator rings and turbine rotors.

What is claimed is:

1. A gas turbine engine having in combination a compressor, a combustion chamber downstream therefrom, means for introducing air and fuel as components which form the main stream flow entering the combustion chamber, means for maintaining combustion in the combustion chamber, at least one stator vane assembly receiving the combustion gases, and at least one turbine rotor bearing turbine blades downstream from the stator assembly and driven by the combustion gas flow, wherein the improvement comprises:

a. the stator vanes having internal passages therein with a coolant fluid circulating therethrough, a heat exchanger receiving the coolant fluid and extracting heat therefrom, a pump impelling the coolant fluid through the stator assembly and the heat exchanger, the stator assembly and the heat exchanger and the pump comprising a closed cooling system;

b. the turbine rotor and the turbine blades having internal passages therein with a coolant fluid circulating therethrough, a heat exchanger borne by the turbine rotor and rotating therewith and receiving the rotor internal coolant and extracting heat therefrom, the turbine blades and turbine rotor and turbine heat exchanger comprising a closed cooling system wherein the rotary motion of the turbine cooling system pumps the internal coolant therethrough by thermosyphon principle;

c. means for directing one of the components which form the main stream flow through the stator heat exchanger and through the rotor heat exchanger to extract heat therefrom; and d. means for directing the heated component after passing through the stator heat exchanger and the rotor heat exchanger into the combustion chamber to take part in the combustion process, whereby the heat energy extracted from the stator vanes and the rotor blades is returned to the energy cycle.

2. The combination recited in claim 1, wherein the internal coolant fluid of the stator cooling system and the internal coolant fluid of the rotor cooling system are selected from the group consisting of liquid metal, gas, and steam.

3. The combination recited in claim 2, wherein the turbine rotor bearing the turbine blades and the turbine heat exchanger is demountable from the engine as a unit without interrupting the closed internal rotor cooling system.

4. The combination recited in claim 3, wherein the rotor has on the upstream face thereof an annular inner manifold and an annular outer manifold concentric therewith, both manifolds communicating with the turbine blade internal passages, the rotor heat exchanger comprising a plurality of U-shaped tubes disposed in an annular tube bundle with their ends communicating respectively with the inner manifold and the outer manifold, means for directing bleed air from the compressor radially outwardly through the tube bundle to extract heat therefrom, and means for directing the heated air after passing through the heat exchanger into the combustion chamber.

5. The combination recited in claim 2, wherein the stator assembly bearing the stator vanes and the stator heat exchanger and the pump for the stator internal coolant is demountable from the engine as a unit without interrupting the closed internal stator cooling system.

6. The combination recited in claim 5, wherein the stator assembly has a circumferential supporting ring bearing an inlet manifold and an outlet manifold for the stator internal coolant, at least one inlet tube for each vane communicating with the inlet manifold and extending radially inwardly to its vane and communicating with the internal passages thereof, at least one outlet tube for each vane communicating with the outlet manifold and extending radially inwardly to its vane and communicating with the internal passages thereof, said inlet and outlet tubes comprising the stator heat exchanger, means for directing bleed air from the compressor through the stator heat exchanger to extract heat therefrom, and means for directing the heated air after passing through the heat exchanger into the combustion chamber.

7. The combination recited in claim 6, wherein the means for directing air through the stator heat exchanger includes liner baffle means directing the air flow first in a downstream direction through the radially outward portion of the stator heat exchanger, and turning baffle means disposed downstream from the heat exchanger reversing the direction of air flow and then directing the air flow in an upstream direction through the radially inward portion of the heat exchanger.

8. The combination recited in claim 7, wherein the radially inner ends of the stator vanes are attached to a generally annular stiffening ring upstream from the rotor, and the upstream rotor face bears a labyrinth seal member extending therefrom and having annular sealing fins, the inner surface of the stiffening ring surrounding the sealing fins in close juxtaposition thereto and cooperating therewith to form a labyrinth seal.

9. The combination recited in claim 7, wherein the stator vanes have inner vane shelves and outer vane shelves, and the outer vane shelves bear extending downstream therefrom an annular shroud member surrounding the rotor blade tips in close juxtaposition thereto.

10. The combination recited in claim 9, wherein the turning baffle means directs a portion of the air flow across the outer surface of the shroud member to cool the same, and the shroud member has apertures therein between the stator vanes and the rotor blades through which apertures the shroud cooling air is discharged into the gas stream driving the rotor blades.

11. The combination recited in claim 9, wherein each radially outward vane end has an exit manifold therein communicating with the vane outlet tube, each vane outer shelf has at least one passage therein communicating with the internal vane passages and at least one passage therein communicating with the vane exit manifold, and the shroud member has a plurality of internal passages therein, each shroud passage communicating through the shelf passages of a vane between the internal passages of said vane and the exit manifold of said vane, whereby the internal coolant of the stator cooling system circulates through the rotor shroud.

12. The combination recited in claim 6, wherein the supporting ring of the stator assembly is detachably mounted on the engine shell, a closed loop of tubing external to the engine shell communicates between the stator inlet manifold and the stator outlet manifold, the tubing having a pump attached thereto in cooperative relationship to pump the stator internal coolant, the external tubing loop and the pump comprising part of the closed stator cooling system, and the stator assembly is demountable from the engine as a unit without interrupting the closed stator cooling system by detaching the supporting ring from the engine shell.

* * * * *